(12) United States Patent
Chang et al.

(10) Patent No.: US 11,505,315 B2
(45) Date of Patent: Nov. 22, 2022

(54) FLYING OBJECT AND FLYING OBJECT POSITION CONTROL SYSTEM

(71) Applicant: Korea Aerospace Research Institute, Yuseong-Gu Daejeon (KR)

(72) Inventors: Sung Ho Chang, Sejong (KR); Yu Shin Kim, Yuseong-Gu Daejeon (KR); Seong Wook Choi, Yuseong-Gu Daejeon (KR); Young Shin Kang, Yuseong-Gu Daejeon (KR); Am Cho, Yuseong-Gu Daejeon (KR)

(73) Assignee: KOREA AEROSPACE RESEARCH INSTITUTE

( * ) Notice: Subject to any disclaimer, the term of this patent is extended or adjusted under 35 U.S.C. 154(b) by 0 days.

(21) Appl. No.: 17/040,896

(22) PCT Filed: Apr. 12, 2019

(86) PCT No.: PCT/KR2019/004420
§ 371 (c)(1),
(2) Date: Sep. 23, 2020

(87) PCT Pub. No.: WO2019/225859
PCT Pub. Date: Nov. 28, 2019

(65) Prior Publication Data
US 2021/0009264 A1    Jan. 14, 2021

(30) Foreign Application Priority Data

May 23, 2018    (KR) .................. 10-2018-0058574

(51) Int. Cl.
*B64C 29/00*    (2006.01)
*B64C 3/38*    (2006.01)
(Continued)

(52) U.S. Cl.
CPC ............ *B64C 29/0033* (2013.01); *B64C 3/38* (2013.01); *B64C 5/02* (2013.01); *B64C 5/06* (2013.01);
(Continued)

(58) Field of Classification Search
CPC ............ B64C 29/0033; B64C 29/0075; B64C 2027/8218; B64C 27/28; B64C 3/385; B64D 31/02; B64D 31/06
See application file for complete search history.

(56) References Cited

U.S. PATENT DOCUMENTS 2,936,968 A * 5/1960 Mazzitelli ........... B64C 29/0033
244/7 C
3,388,878 A * 6/1968 Peterson ............. B64C 29/0033
244/12.3
(Continued)

FOREIGN PATENT DOCUMENTS

CN    101643116 A    2/2010
JP    05193583 A    8/1993
(Continued)

OTHER PUBLICATIONS

International Search Report from PCT/KR/2019/004420 dated Jul. 24, 2019.
(Continued)

*Primary Examiner* — Richard R. Green
*Assistant Examiner* — William L Gmoser
(74) *Attorney, Agent, or Firm* — William J. Lenz; Neal, Gerber & Eisenberg LLP

(57) ABSTRACT

The flying object according to one embodiment comprises: a main body; a main wing formed on a side surface of the main body; a duct-shaped first propulsion part which is provided outside the main wing and can be tilted; a second propulsion part arranged behind the main body; horizontal
(Continued)

tail wings formed on both side surfaces of the second propulsion part; and a control part for controlling the movement of the first propulsion part, second propulsion part, and horizontal tail wings, wherein the control part controls the second propulsion part and the horizontal tail wings according to the tilt angle of the first propulsion part.

14 Claims, 9 Drawing Sheets

(51) Int. Cl.
| | | |
|---|---|---|
| | *B64C 5/02* | (2006.01) |
| | *B64C 5/06* | (2006.01) |
| | *B64C 5/10* | (2006.01) |
| | *B64C 13/02* | (2006.01) |
| | *B64C 27/20* | (2006.01) |
| | *B64D 31/02* | (2006.01) |

(52) U.S. Cl.
CPC ............... *B64C 5/10* (2013.01); *B64C 13/02* (2013.01); *B64C 27/20* (2013.01); *B64D 31/02* (2013.01)

(56) References Cited

U.S. PATENT DOCUMENTS

| | | | | |
|---|---|---|---|---|
| 4,828,203 | A | * | 5/1989 | Clifton ............... B64C 29/0025 244/12.3 |
| 5,407,150 | A | * | 4/1995 | Sadleir ............... B64C 29/0025 244/23 B |
| 2015/0314865 | A1 | | 11/2015 | Bermond et al. |
| 2018/0086448 | A1 | * | 3/2018 | Kroo ................... B64C 29/0033 |
| 2018/0222580 | A1 | * | 8/2018 | DeLorean ............... B64C 39/04 |
| 2021/0094374 | A1 | * | 4/2021 | Hirabayashi ........ B64C 29/0033 |

FOREIGN PATENT DOCUMENTS

| | | | |
|---|---|---|---|
| JP | 2010254264 A | 11/2010 | |
| KR | 1020090067686 A | 6/2009 | |
| KR | 1020150086398 A | 7/2015 | |
| WO | WO-2019150128 A1 * | 8/2019 | ......... B64C 29/0008 |

OTHER PUBLICATIONS

Written Opinion of the International Searching Authority dated Jul. 24, 2019.

* cited by examiner

FLYING OBJECT AND FLYING OBJECT POSITION CONTROL SYSTEM

CROSS-REFERENCE TO RELATED APPLICATIONS

This application is a national stage patent application of PCT/KR2019/004420, filed on Apr. 12, 2019 entitled FLYING OBJECT AND FLYING OBJECT POSITION CONTROL SYSTEM and claiming priority from Korean Patent Application No. KR-2018-0058574, filed May 23, 2018, both of which are incorporated by reference in their entirety.

TECHNICAL FIELD

Example embodiments relate to a flying object.

BACKGROUND ART

By applying a duct to a propeller of a flying object capable of vertically taking off and landing, a thrust force may increase by an effect of the duct. However, when a sufficient force is not generated to overcome a pitch moment and a momentum drag that are generated by the shape of the duct, a fuselage or a body of the flying object may become unstable or fall. To overcome these, there is a method of reducing the length of a duct or additionally mounting or increasing control surfaces under a duct to increase a controlling force.

By applying such a method of reducing the length of a duct, it is possible to reduce a crosswind effect under a vertical takeoff and landing condition of a flying object. However, in the case of a flying object with a tiltable duct, a lift force generated in the duct during a forward flight may decrease, and thus there is a limit to the reduction of the length of the duct.

A flying object with a duct may be generally in the shape of a single duct and be vertical in the case of vertical takeoff and landing and hovering. In the case of a forward flight, the flying object may fly with its posture tilted. However, the flying object may not be able to be tilted exceeding a certain posture, and thus not possible to fly at a high speed.

In the case of a flying object in which a tiltable duct is provided in its wing or fuselage for a high-speed flight, the flying object may operate as a fixed-wing flying object while taking off and landing and horizontally rotating or being tilted, in a state in which the duct is in a vertical shape.

In addition, a drone started in a military industry refers to a flying object in the shape of an aircraft or helicopter that flies by the induction of radio waves without a human being aboard. The drone is recently being used widely for military and commercial purposes, and accordingly research on this is vigorously being conducted.

In particular, a drone having a great sensing capability with a camera, a sensor, and the like, and having rapid mobility is being used in various fields, such as, for example, transportation, security, surveillance, observation, or the like.

As an instance of the foregoing, American shopping mall companies are planning to construct a distribution and delivery system using a drone and promoting this.

A drone may be provided in various types, for example, a fixed-wing type, a rotary-wing type, and a complex type, according to the purpose of use. The fixed-wing type drone refers to a drone that flies using a lift force generated by a fixed wing as in a general aircraft.

In such a case, a drone in which a tiltable duct is provided in a wing or fuselage for a high-speed flight may operate as a fixed-wing flying object while taking off and landing and horizontally rotating or being tilted, in a state in which the duct is in a vertical shape.

For example, Korean Patent Publication No. 10-2009-0067686 discloses a tilt-duct aircraft.

DISCLOSURE OF INVENTION

Technical Goals

An aspect provides a flying object that offsets a moment generated as a first propulsion portion disposed at the front of the flying object and formed in the shape of a duct is tilted, by applying a second propulsion portion disposed at the rear of the flying object.

Another aspect provides a flying object and a system for controlling a posture of the flying object that control a moment generated as a first propulsion portion of the flying object is tilted, by interlocking and controlling a horizontal tail wing and a second propulsion portion of the flying object.

Still another aspect provides a flying object and a system for controlling a posture of the flying object that generate a sufficient lift force without being disturbed by the air flowing into a second propulsion portion of the flying object in a rotary-wing flight, by interlocking and controlling a horizontal tail wing of the flying object and the second propulsion portion.

Technical Solutions

According to an example embodiment, there is provided a flying object including a main body, a main wing formed on a side surface of the main body, a first propulsion portion provided on an outer side of the main wing and configured to be tilted, a second propulsion portion disposed at the rear of the main body, a horizontal tail wing formed on both side surfaces of the second propulsion portion, and a controller configured to control a movement of the first propulsion portion, the second propulsion portion, and the horizontal tail wing. The controller may control the second propulsion portion and the horizontal tail wing in response to a tilt angle of the first propulsion portion by which the first propulsion portion is tilted.

When the tilt angle of the first propulsion portion corresponds to a rotary wing, the controller may control a rear end of the horizontal tail wing to be tilted downwards with respect to a horizon. As the tilt angle of the first propulsion portion changes from the rotary wing to a fixed wing, the controller may control the rear end of the horizontal tail wing to become horizontal or parallel gradually.

The flying object may further include a vertical tail wing formed at a rear end of the main body. The second propulsion portion may be formed in the shape of a propeller and disposed under the vertical tail wing.

When the tilt angle of the first propulsion portion corresponds to the rotary wing, the controller may control a pitch angle of a rear end of a wing of the second propulsion portion to have a negative value with respect to the horizon. As the tilt angle of the first propulsion portion changes from the rotary wing to the fixed wing, the controller may control a magnitude of the pitch angle of the rear end of the wing of the second propulsion portion to decrease gradually.

In addition, as the tilt angle of the first propulsion portion changes from the rotary wing to the fixed wing, the controller may control power of the second propulsion portion to decrease gradually.

The first propulsion portion may be formed in the shape of a duct.

According to another example embodiment, there is provided a system for controlling a posture of a flying object. When a tilt angle of a first propulsion portion disposed on a side surface of the flying object corresponds to a rotary wing, the system may control a rear end of a horizontal tail wing disposed at the rear of the flying object to be tilted downwards with respect to a horizon. As the tilt angle of the first propulsion portion changes form the rotary wing to a fixed wing, the system may control the rear end of the horizontal tail wing to become horizontal or parallel.

In addition, when the tilt angle of the first propulsion portion corresponds to the rotary wing, the system may control a pitch angle of a rear end of a wing of a second propulsion portion formed in the shape of a propeller at a rear end of the flying object to have a negative value with respect to the horizon. As the tilt angle of the first propulsion portion changes from the rotary wing to the fixed wing, the system may control a magnitude of the pitch angle of the rear end of the wing of the second propulsion portion to decrease gradually.

As the tilt angle of the first propulsion portion changes from the rotary wing to the fixed wing, the system may control power of the second propulsion portion to decrease gradually.

The first propulsion portion may be formed in the shape of a duct.

Advantageous Effects

According to example embodiments described herein, a flying object may offset a moment that is generated as a first propulsion portion disposed at the front of the flying object and formed in the shape of a duct is tilted, by applying a second propulsion portion disposed at the rear of the flying object.

According to example embodiments described herein, a flying object and a system for controlling a posture of the flying object may control a moment that is generated as a first propulsion portion of the flying object is tilted by interlocking and controlling a horizontal tail wing and a second propulsion portion of the flying object.

According to example embodiments described herein, a flying object and a system for controlling a posture of the flying object may generate a sufficient lift force without being disturbed by the air flowing into a second propulsion portion of the flying object in a rotary-wing flight by interlocking and controlling a horizontal tail wing of the flying object and the second propulsion portion.

BEST MODE FOR CARRYING OUT THE INVENTION

Hereinafter, example embodiments will be described in detail with reference to the accompanying drawings. The following description is about one of the various aspects of the present disclosure and details of the example embodiments.

In the description of examples, detailed description of well-known related structures or functions will be omitted when it is deemed that such description will cause ambiguous interpretation of the present disclosure.

The terminology used herein is for the purpose of describing particular examples only and is not to be limiting of the examples.

In addition, the terms used herein should be interpreted as having a meaning that is consistent with their meaning in the context of the relevant art and will not be interpreted in an idealized or overly formal sense unless expressly so defined herein.

The terms should be interpreted as having a meaning and technical concept that is consistent with a flying object and a system for controlling a posture of the flying object according to example embodiments.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. A flying object and a system for controlling a posture of the flying object according to example embodiments should be understood to include all changes, equivalents, and replacements within the idea and the technical scope of the present disclosure.

Figure 1:
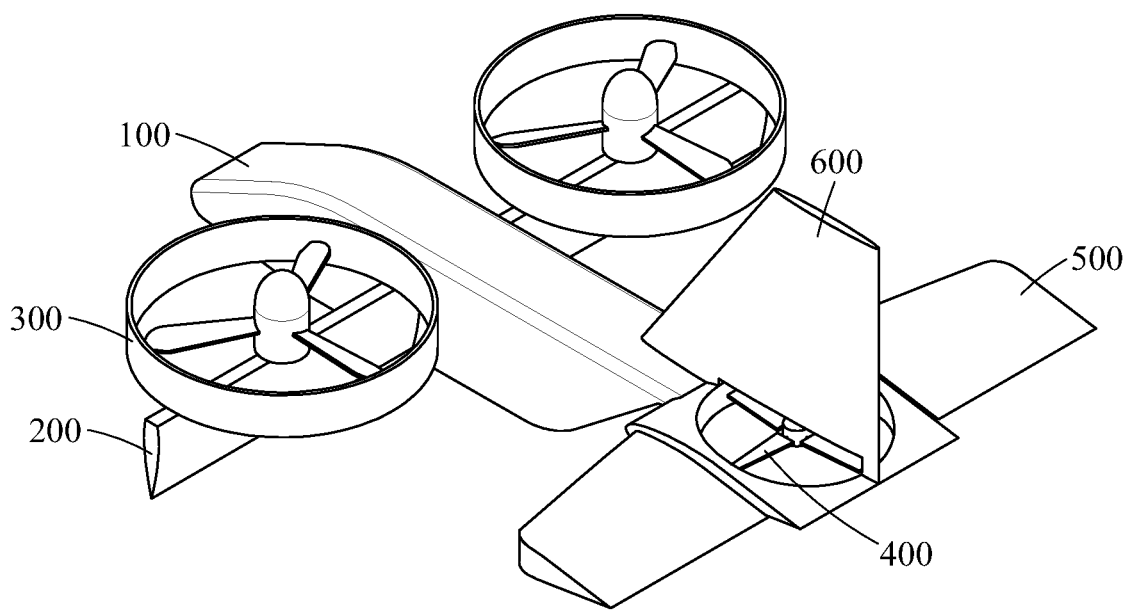
FIG. 1 is a perspective view of a flying object according to an example embodiment.
Figure 2:
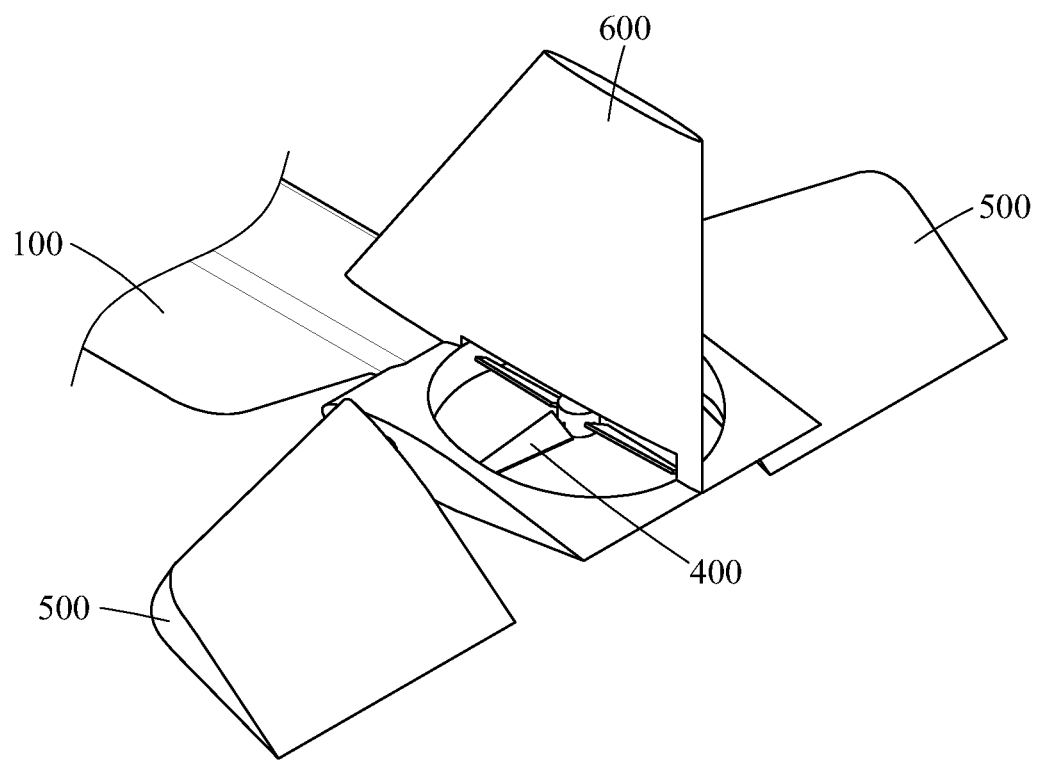
FIGS. 2 and 3 are enlarged views of a second propulsion portion and a horizontal tail wing, respectively.
Figure 3:
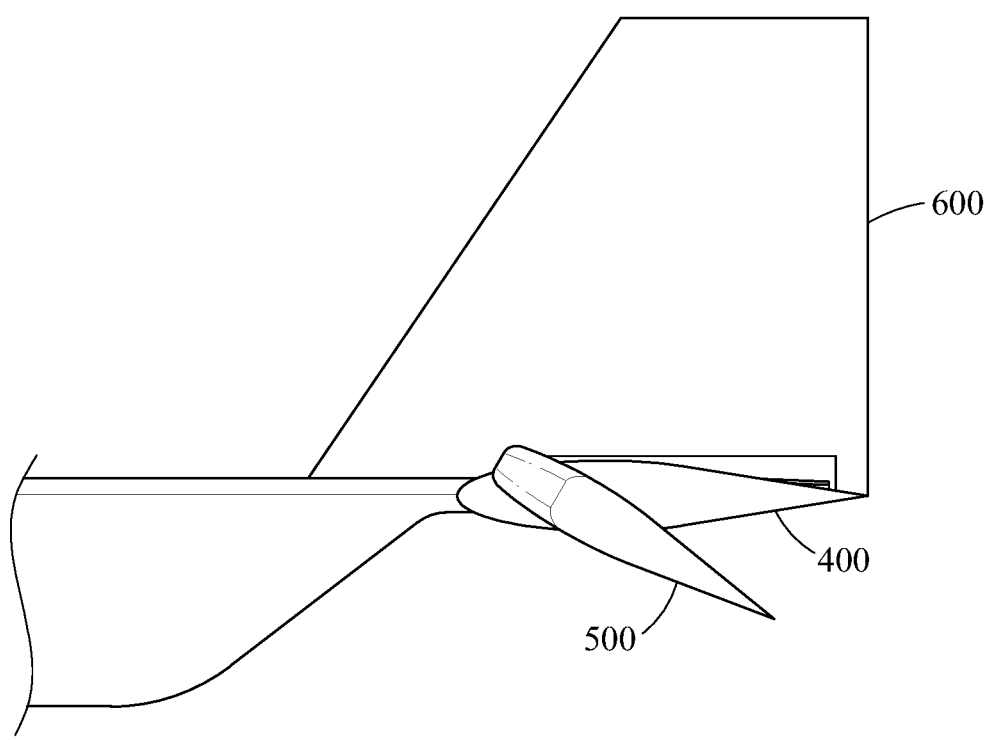
Figure 4:
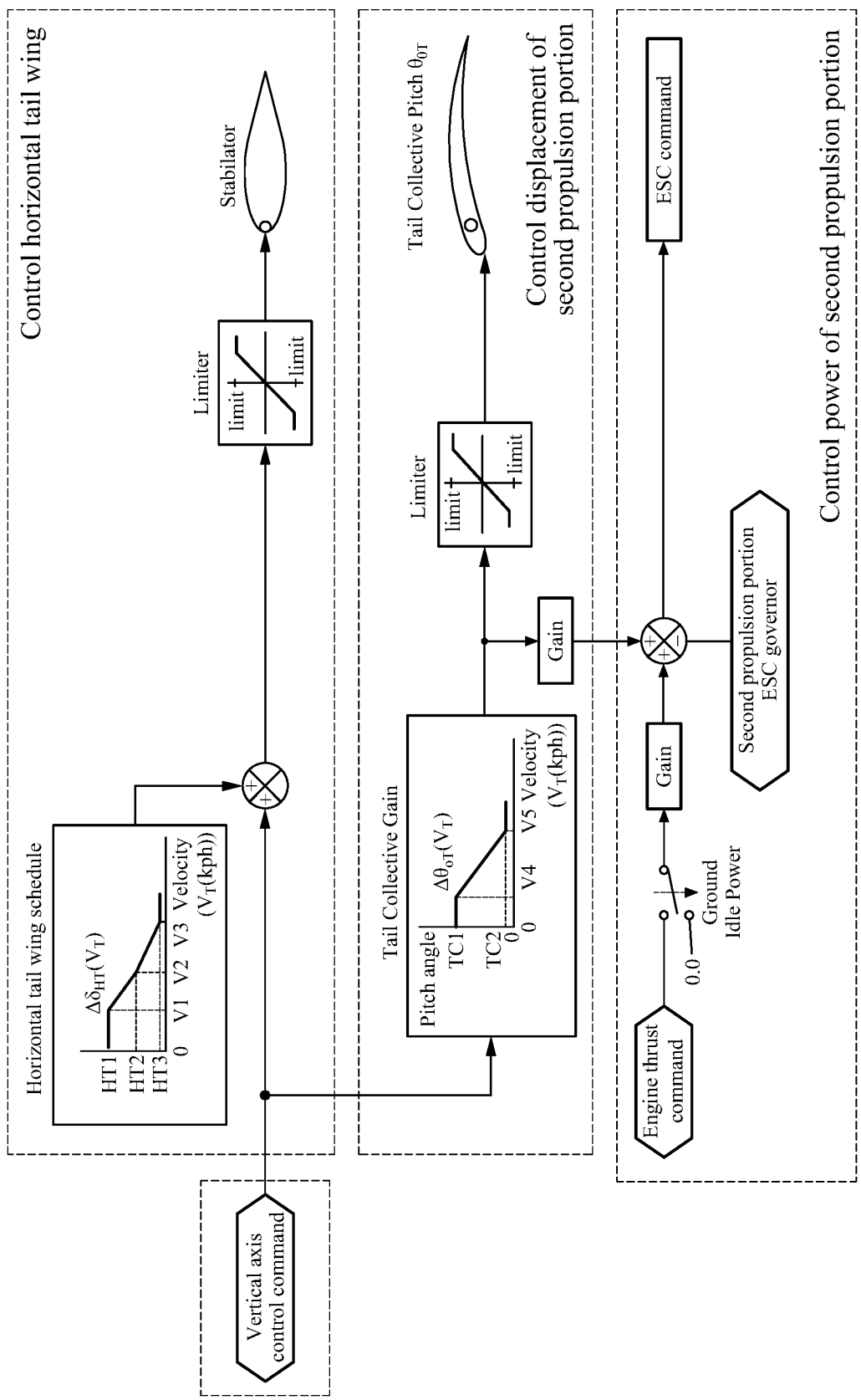
FIG. 4 is a diagram illustrating a method to be performed by a controller of a flying object to control a horizontal tail wing and a second propulsion portion based on a vertical axis control command according to an example embodiment.
Figure 5:
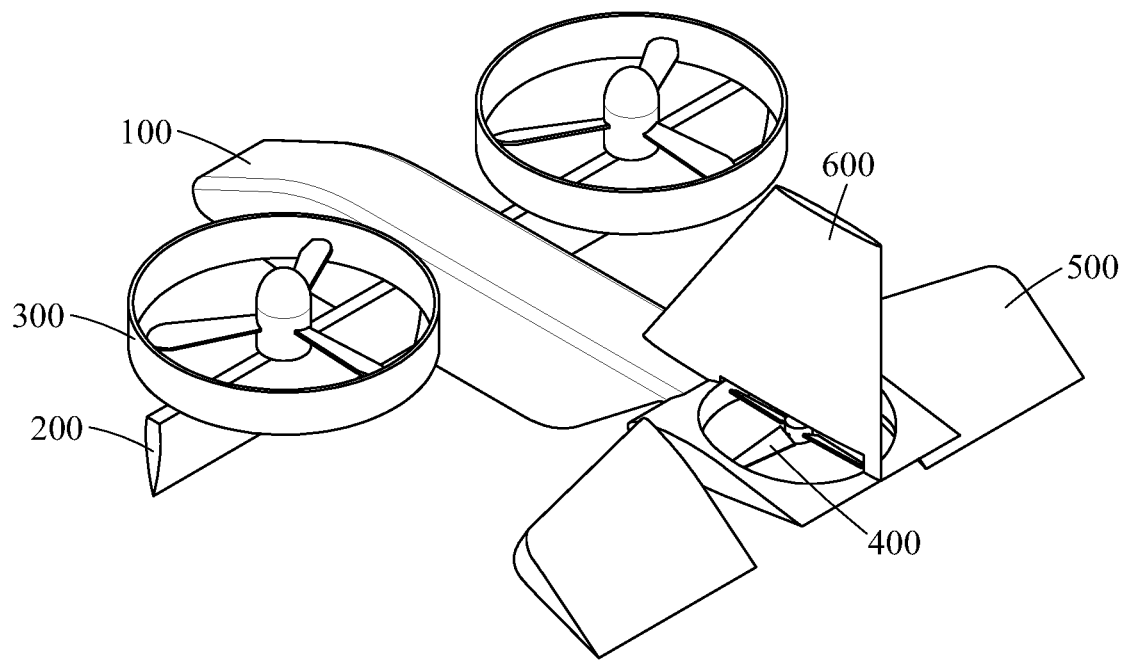
FIG. 5 illustrates a state in which a flying object takes off.
Figure 6:
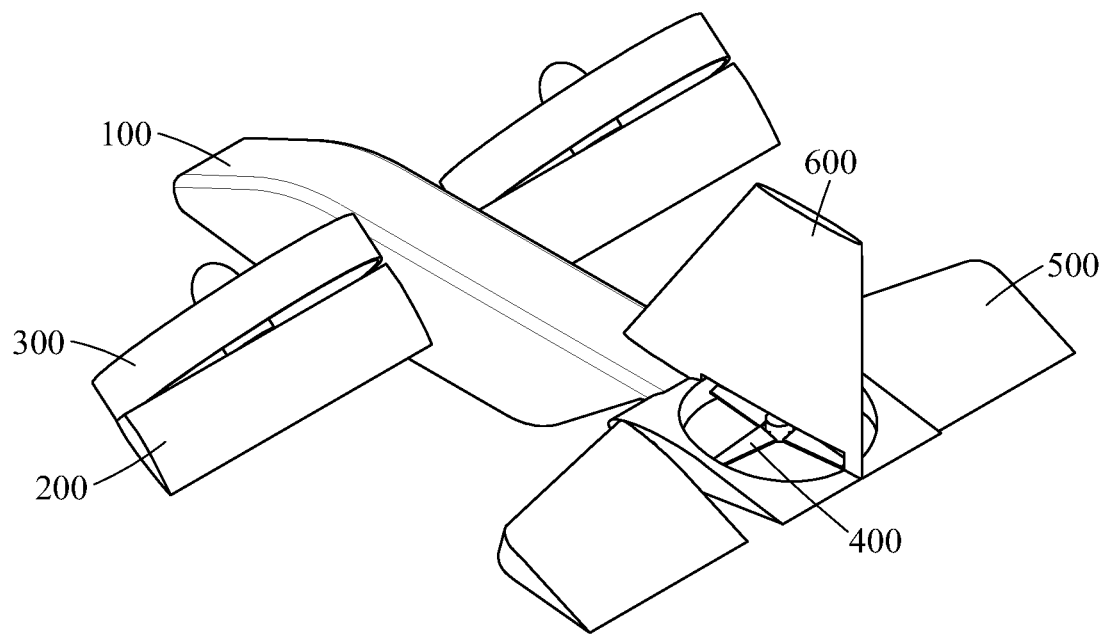
FIG. 6 illustrates a transition from a rotary-wing flight to a fixed-wing flight of a flying object.
Figure 7:
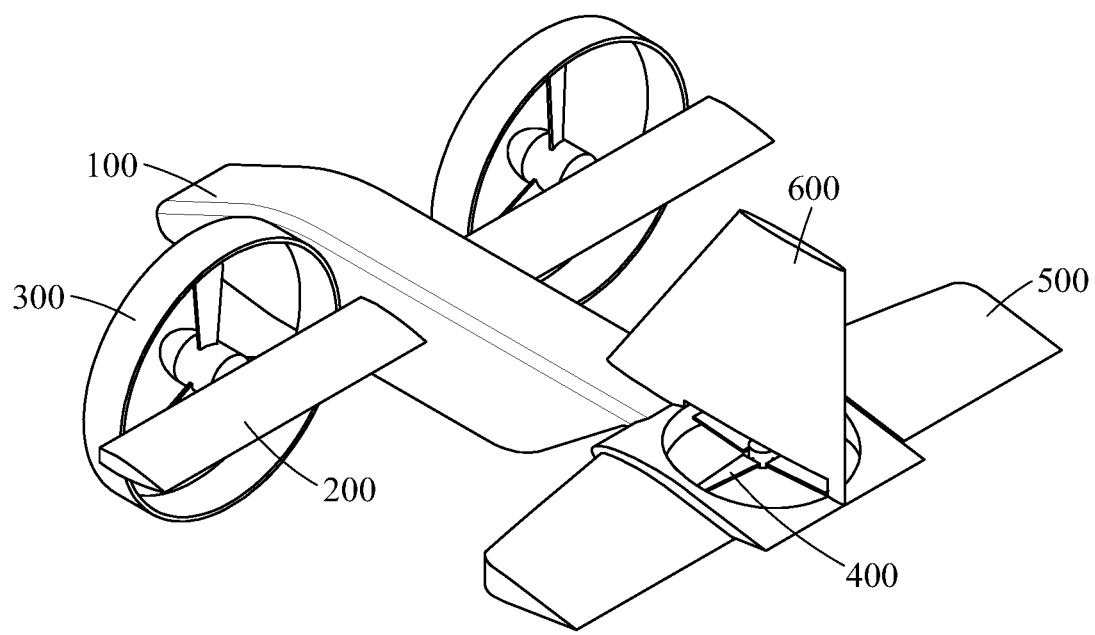
FIG. 7 illustrates a fixed-wing flight state of a flying object.
Figure 8:
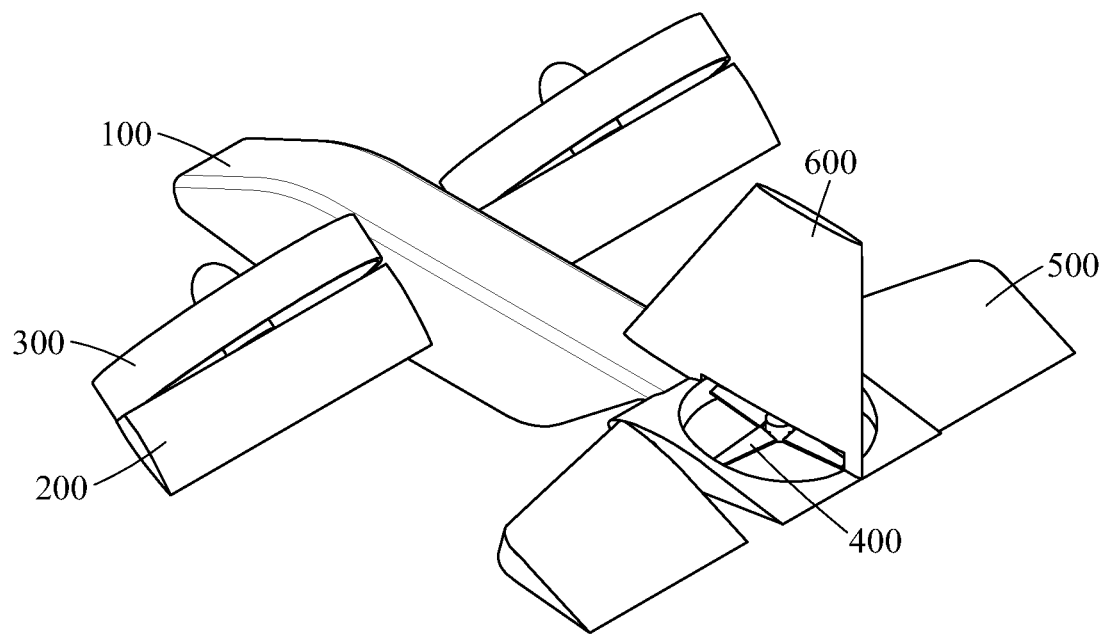
FIG. 8 illustrates a transition from a fixed-wing flight to a rotary-wing flight of a flying object.
Figure 9:
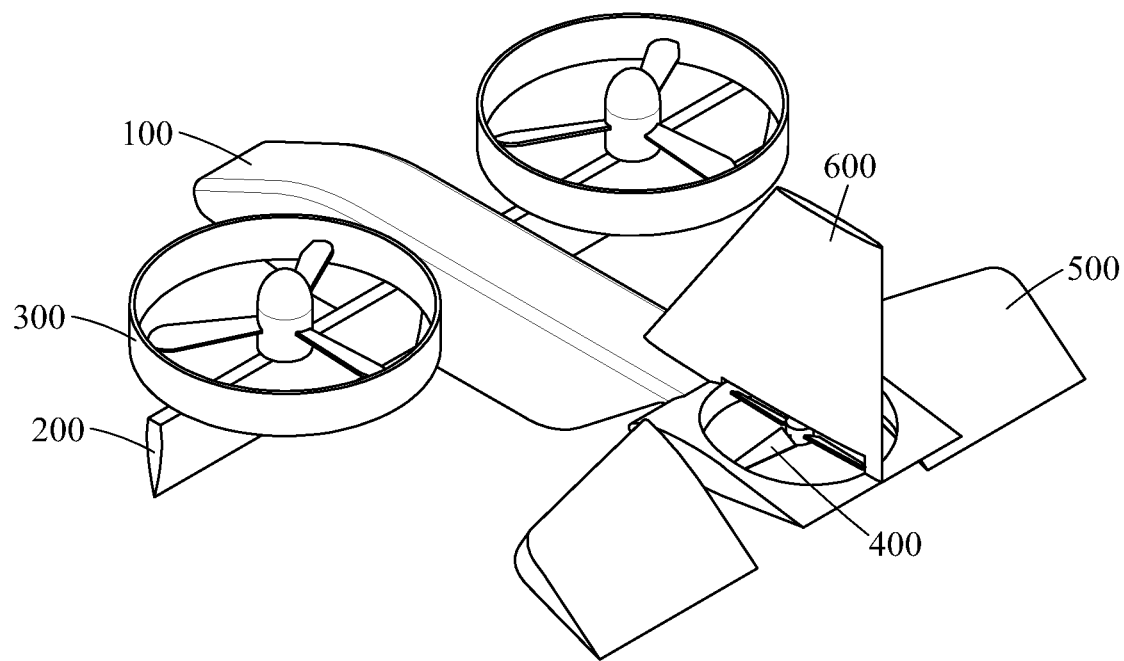
FIG. 9 illustrates a state in which a flying object lands.

FIG. 1 is a perspective view of a flying object according to an example embodiment. FIGS. 2 and 3 are enlarged views of a second propulsion portion and a horizontal tail wing, respectively. FIG. 4 is a diagram illustrating a method to be performed by a controller of a flying object to control a horizontal tail wing and a second propulsion portion based on a vertical axis control command according to an example embodiment. FIG. 5 illustrates a state in which a flying object takes off. FIG. 6 illustrates a transition from a rotary-wing flight to a fixed-wing flight of a flying object. FIG. 7 illustrates a fixed-wing flight state of a flying object. FIG. 8 illustrates a transition from a fixed-wing flight to a rotary-wing flight of a flying object. FIG. 9 illustrates a state in which a flying object lands.

Referring to FIG. 1, a flying object 10 includes a main body 100, a main wing 200 formed on a side surface of the main body 100, a first propulsion portion 300 provided on an outer side of the main wing 200 and configured to be tilted, a second propulsion portion 400 disposed at the rear of the main body 100, and a horizontal tail wing 500 formed on both side surfaces of the second propulsion portion 400. The second propulsion portion 400 and the horizontal tail wing 500 are controlled in response to a tilt angle by which the first propulsion portion 200 is tilted. That is, when the tilt angle of the first propulsion portion 200 changes between a rotary-wing state and a fixed-wing state, a pitch angle and power of the second propulsion portion 400 may be controlled and an angle of a rear end of the horizontal tail wing 500 may also be controlled, in response to such a change.

The first propulsion portion 300 may be formed in the shape of a duct.

In addition, the flying object 10 further includes a vertical tail wing 600 formed at a rear end of the main body 100. In such a case, the second propulsion portion 400 is formed in the shape of a propeller and disposed under the vertical tail wing 600.

The main body 100 may be generally of a streamlined form as a basic frame, but not be limited thereto. It may be provided in various forms as in a drone, for example, a cylindrical form, an octahedral form, and the like.

The main wing 200 is formed on both side surfaces of the main body 100 and formed in the shape of an airfoil.

The first propulsion portion 300 is provided on the outer side of the main wing 200, and includes a propeller configured to generate a thrust force by being rotated and a duct element configured to surround an outer side of the propeller.

The first propulsion portion 300 is supported by the main wing 200 and tilted to be a rotary wing and a fixed wing. Thus, when the flying object 10 vertically takes off and lands or hovers, the first propulsion portion 300 is tilted to be the rotary wing. When the flying object 10 flies in a forward flight, the first propulsion portion 300 is tilted to be the fixed wing.

Referring to FIGS. 2 and 3, when the tilt angle of the first propulsion portion 300 corresponds to the rotary wing, a rear end of the horizontal tail wing 500 is tilted downwards with respect to a horizontal line.

In addition, when the tilt angle of the first propulsion portion 300 corresponds to the rotary wing, a pitch angle of a rear end of a wing of the second propulsion portion 400 has a negative value with respect to the horizontal line.

That is, when the tilt angle of the first propulsion portion 300 is in a rotary-wing state, the rear end of the horizontal tail wing 500 and the rear end of the wing of the second propulsion portion 400 are both controlled to be tilted downwards with respect to the horizontal line. Through such controlling, it is possible to offset a moment of lifting the flying object 10 that is generated as a pitch moment and a momentum drag are generated when the first propulsion portion 300 is in the rotary-wing state and a low-speed transitional flight state.

On the other hand, after the flying object 10 takes off, when such a state changes to a high-speed flight state and the tilt angle of the first propulsion portion 300 changes from the rotary wing to the fixed wing, the rear end of the horizontal tail wing 500 is tilted again to be horizontal. In addition, a magnitude of the pitch angle of the rear end of the wing of the propeller of the second propulsion portion 400 decreases gradually.

That is, as the tilt angle of the first propulsion portion 300 changes from the rotary wing to the fixed wing, a tilt angle of the rear end of the horizontal tail wing 500 and a tilt angle of the rear end of the wing of the propeller of the second propulsion portion 400 are both controlled to be close to the horizontal line.

For example, when the first propulsion portion 300 is in the rotary-wing state, the pitch angle of the rear end of the wing of the propeller of the second propulsion portion 400 may be −25 degrees (°) to −28° with respect to the horizontal line. When the first propulsion portion 300 is in the fixed-wing state, the pitch angle of the rear end of the wing of the propeller of the second propulsion portion 400 may be −2° to −3° with respect to the horizontal line. However, the angle is not limited to the foregoing example.

In addition, as the tilt angle of the first propulsion portion 300 changes from the rotary angle to the fixed wing, power of the propeller of the second propulsion portion 400 decreases gradually.

According to an example embodiment, a flying object may include a controller configured to control respective movements of a first propulsion portion, a second propulsion portion, and a horizontal tail wing. The controller may control the horizontal tail wing and the second propulsion portion based on a vertical axis control command as illustrated in FIG. 4.

That is, the controller may control a tilt of the horizontal tail wing based on the vertical axis control command, and control displacement and power (e.g., the number of revolutions) of the second propulsion portion. As a flying speed of the flying object increases, for example, when a tilt angle of the first propulsion portion changes from a rotary-wing state to a fixed-wing state, the controller may control a tilt angle of a rear end of the horizontal tail wing to decrease gradually. In addition, as the flying speed of the flying object increases, for example, when the tilt angle of the first propulsion portion changes from the rotary-wing state to the fixed-wing state, the controller may control a pitch angle of a rear end of a wing of the second propulsion portion to decrease gradually, for the displacement of the second propulsion portion. Further, as the flying speed of the flying object increases, for example, when the tilt angle of the first propulsion portion changes from the rotary-wing state to the fixed-wing state, the controller may gradually reduce power of the second propulsion portion.

Hereinafter, how a first propulsion portion 300, a second propulsion portion 400, and a horizontal tail wing 500 of a flying object 10 are interlocked and change in a process from takeoff to landing of the flying object 10 will be described in detail with reference to FIGS. 5 through 9.

As illustrated in FIG. 5, the flying object 10 may generate a thrust force while the first propulsion portion 300 is in a rotary-wing state when it is taking off. In such a rotary-wing flight state, the first propulsion portion 300 is tilted to be a rotary wing, and a rear end of the horizontal tail wing 500 is tilted downwards with respect to a horizontal line. In addition, a rear end of a wing of a propeller of the second propulsion portion 400 is tilted downwards with respect to the horizontal line. That is, a pitch angle of the rear end of the wing of the second propulsion portion 400 has a negative value with respect to the horizontal line.

Subsequently, as illustrated in FIG. 6, in a low-speed transitional flight state, the first propulsion portion 300 is gradually tilted to change from the rotary-wing state to the fixed-wing state. Here, a tilt of the rear end of the horizontal tail wing 500 changes in a direction approaching the horizontal line. In addition, for the wing of the propeller of the second propulsion portion 400, a magnitude of the pitch angle of the rear end decreases gradually. Further, the power, for example, the number of revolutions, of the second propulsion portion 400 decreases gradually.

Finally, as illustrated in FIG. 7, in a high-speed transitional flight state of the flying object 10, the first propulsion portion 300 is tilted to be in a complete fixed-wing state. Here, the rear end of the horizontal tail wing 500 and the rear end of the wing of the propeller of the second propulsion portion 400 have tilt angles close to the horizontal line.

However, the angles are not limited to the foregoing, and they may be controlled to be tilted by various angles as needed.

As illustrated in FIG. 8, in a low-speed transitional flight state for landing after a high-speed flight, the first propulsion portion 300 is gradually tilted to change from the fixed wing to the rotary wing. Here, the rear end of the horizontal tail wing 500 is gradually tilted downwards with respect to the horizontal line. In addition, for the wing of the propeller of the second propulsion portion 400, the magnitude of the pitch angle of the rear end increases gradually. Further, the power, for example, the number of revolutions, of the second propulsion portion 400 increases gradually.

Subsequently, as illustrated in FIG. 9, in a rotary-wing flight state for landing, the first propulsion portion 300 is tilted to be the rotary wing. Here, the rear end of the horizontal tail wing 500 is tilted downwards with respect to the horizontal line. In addition, the rear end of the wing of the propeller of the second propulsion portion 400 is also tilted downwards with respect to the horizontal line. Thus, the flying object 10 may land on the ground while maintaining its stable posture.

Hereinafter, a system for controlling a posture of a flying object that is used to stably control a posture of a flying object having a duct-shaped tiltable propulsion portion described above will be described in detail.

According to an example embodiment, when a tilt angle of a first propulsion portion disposed on a side surface of a flying object corresponds to a rotary wing, a system for controlling a posture of a flying object may control a rear end of a horizontal tail wing disposed at the rear of the flying object to be tilted downwards with respect to a horizontal line. As the tilt angle of the first propulsion portion changes from a rotary-wing state to a fixed-wing state, the system may control the rear end of the horizontal tail wing to become horizontal or parallel.

Here, the first propulsion portion is formed in the shape of a duct.

In addition, when the tilt angle of the first propulsion portion corresponds to the rotary wing, the system may control a pitch angle of a rear end of a wing of a second propulsion portion formed in the shape of a propeller at a rear end of the flying object to have a negative value with respect to the horizontal line. As the tilt angle of the first propulsion portion changes from the rotary-wing state to the fixed-wing state, the system may control a magnitude of the pitch angle of the rear end of the wing of the second propulsion portion to decrease gradually.

Further, as the tilt angle of the first propulsion portion changes from the rotary-wing state to the fixed-wing state, the system may control the power of the second propulsion power to decrease gradually.

As described herein, when applying a propulsion portion of a tilt-duct type to an unmanned aerial vehicle or flying object, using a structure that surrounds a propeller with a duct element may enable the flying object to fly without worrying about a potential loss of human lives even in a highly dense area such as a residential area. In addition, by controlling a tilt angle of a horizontal tail wing and a tilt angle of a separate propulsion portion disposed at the rear of the flying object, or controlling power of the separate propulsion portion, according to a tilt angle of the propulsion portion of the tilt-duct type, it is possible to maintain a stable posture of the flying object.

According to an example embodiment, a flying object may offset a moment that is generated as a first propulsion portion disposed at the front of the flying object and formed in a duct shape is tilted, by using a second propulsion portion disposed at the rear of the flying object.

According to an example embodiment, a flying object and a system for controlling a posture of the flying object may control a moment that is generated as a first propulsion portion of the flying object is tilted by interlocking and controlling a horizontal tail wing and a second propulsion portion of the flying object.

According to an example embodiment, a flying object and a system for controlling a posture of the flying object may generate a sufficient lift force without being disturbed by the air flowing into a second propulsion portion in a rotary-wing flight, by interlocking and controlling a horizontal tail wing and the second propulsion portion of the flying object.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A flying object comprising:
    a main body;
    a main wing formed on a side surface of the main body;
    a first propulsion portion provided on an outer side of the main wing and configured to be tilted;
    a second propulsion portion disposed at a rear of the main body, wherein the second propulsion portion includes a propeller disposed in a horizontal duct;
    a horizontal tail wing formed on both side surfaces of the second propulsion portion;
    a vertical tail wing formed at the rear end of the main body, wherein the vertical tail wing bisects and extends vertically from the horizontal duct of the second propulsion portion; and
    a controller configured to:
        control a tilt angle of the first propulsion portion to transition the first propulsion portion between being a rotary wing and a fixed wing, and
        control a tilt angle of the second propulsion portion and a tilt angle of a rear end of the horizontal tail wing based on the tilt angle of the first propulsion portion,
        wherein the tilt angle of the second propulsion portion is configured to change relative to the tilt angle of the rear end of the horizontal tail wing as the first propulsion portion transitions between the rotary wing and the fixed wing, and
        wherein, as the first propulsion portion changes from being the fixed wing to being the rotary wing:
            the rear end of the horizontal tail wing tilts downward, and
            a magnitude of the tilt angle of the second propulsion portion increases.

2. The flying object of claim 1, wherein, when the first propulsion portion is positioned as the rotary wing, the controller is configured to control the rear end of the horizontal tail wing to be tilted downwards with respect to a horizon.

3. The flying object of claim 2, wherein, when first propulsion portion is positioned as the rotary wing, the controller is configured to control the tilt angle of the second propulsion portion to have a negative value with respect to the horizon.

4. The flying object of claim 1, wherein, as the tilt angle of the first propulsion portion changes from being positioned as the rotary wing to being positioned as the fixed wing, the controller is configured to control power of the second propulsion portion to decrease gradually.

5. The flying object of claim 1, wherein the first propulsion portion is formed in the shape of a duct.

6. A system for controlling a posture of a flying object, configured to:
   control a tilt angle of a first propulsion portion disposed on a side surface of the flying object to transition between a rotary wing and a fixed wing,
   control a tilt angle of a second propulsion portion and a tilt angle of a rear end of a horizontal tail wing that are disposed at a rear of the flying object based on the tilt angle of the first propulsion portion, wherein the second propulsion portion includes a propeller disposed in a horizontal duct, wherein a vertical tail wing that is formed at the rear end of the main body bisects and extends vertically from the horizontal duct of the second propulsion portion, wherein the tilt angle of the second propulsion portion is configured to change relative to the tilt angle of the rear end of the horizontal tail wing as the first propulsion portion transitions between the rotary wing and the fixed wing, and
   as the first propulsion portion changes from being positioned as the fixed wing to be positioned as the rotary wing:
      control the rear end of the horizontal tail wing to tilt downward, and
      control a magnitude of the tilt angle of the second propulsion portion to increase.

7. The system of claim 6, configured to:
   when the first propulsion portion is positioned as the rotary wing, control the tilt angle of the second propulsion portion to have a negative value with respect to the horizon.

8. The system of claim 6, configured to:
   as the first propulsion portion changes from being positioned as the rotary wing to being positioned as the fixed wing, control power of the second propulsion portion to decrease gradually.

9. The system of claim 6, wherein the first propulsion portion is formed in the shape of a duct.

10. The system of claim 6, configured to:
    as the first propulsion portion changes from being positioned as the rotary wing to being positioned as the fixed wing, control the rear end of the horizontal tail wing to approach being horizontal and control the magnitude of the tilt angle of the second propulsion portion to decrease.

11. The system of claim 10, configured to:
    when the first propulsion portion is positioned as the fixed wing, control the rear end of the horizontal tail wing and the second propulsion portion to be horizontal.

12. The system of claim 7, configured to:
    when the tilt angle of the first propulsion portion is positioned as the rotary wing, control the tilt angle of the rear end of the horizontal tail wing to be tilted downward.

13. The flying object of claim 1, wherein, when the first propulsion portion changes from being positioned as the rotary wing to being positioned as the fixed wing, the controller is configured to control the rear end of the horizontal tail wing to approach being horizontal and control the magnitude of the tilt angle of the second propulsion portion to decrease.

14. The flying object of claim 13, wherein, when the first propulsion portion is positioned as the fixed wing, the controller is configured to control the rear end of the horizontal tail wing and the second propulsion portion to be horizontal.

* * * * *